(12) United States Patent
Okamoto et al.

(10) Patent No.: US 10,014,539 B2
(45) Date of Patent: Jul. 3, 2018

(54) FUEL CELL SYSTEM

(71) Applicant: TOYOTA JIDOSHA KABUSHIKI KAISHA, Toyota-shi, Aichi-ken (JP)

(72) Inventors: Yohei Okamoto, Kasugai (JP);
Hiroyuki Imanishi, Toyota (JP);
Hiroyuki Suzuki, Gifu (JP); Takashi Yamada, Hekinan (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 68 days.

(21) Appl. No.: 15/186,660

(22) Filed: Jun. 20, 2016

(65) Prior Publication Data

US 2016/0380290 A1 Dec. 29, 2016

(30) Foreign Application Priority Data

Jun. 25, 2015 (JP) ................. 2015-127688

(51) Int. Cl.
| | | |
|---|---|---|
| *H01M 8/04* | (2016.01) | |
| *H01M 8/04746* | (2016.01) | |
| *H01M 16/00* | (2006.01) | |
| *H01M 8/04828* | (2016.01) | |
| *H01M 8/0438* | (2016.01) | |
| *H01M 8/04537* | (2016.01) | |

(52) U.S. Cl.
CPC ..... *H01M 8/04753* (2013.01); *H01M 8/0494* (2013.01); *H01M 8/04425* (2013.01); *H01M 8/04589* (2013.01); *H01M 16/006* (2013.01)

(58) Field of Classification Search
CPC ......... H01M 8/04753; H01M 8/04425; H01M 8/04589; H01M 8/0494; H01M 16/006
See application file for complete search history.

(56) References Cited

U.S. PATENT DOCUMENTS

| | | | |
|---|---|---|---|
| 2009/0148735 A1 | 6/2009 | Manabe et al. | |
| 2010/0047630 A1* | 2/2010 | Imanishi ........... | H01M 8/04268 429/437 |
| 2010/0112402 A1 | 5/2010 | Ogawa | |
| 2016/0141689 A1 | 5/2016 | Okamoto et al. | |

FOREIGN PATENT DOCUMENTS

| | | | |
|---|---|---|---|
| CN | 101523653 A | | 9/2009 |
| JP | 2004-152679 A | | 5/2004 |
| JP | 2004335343 A | * | 11/2004 |
| JP | 2007-184243 | | 7/2007 |
| JP | 2008-269813 A | | 11/2008 |
| JP | 2016-95964 | | 5/2016 |
| KR | 10-2008-0066075 A | | 7/2008 |

* cited by examiner

*Primary Examiner* — Gregg Cantelmo
(74) *Attorney, Agent, or Firm* — Finnegan, Henderson, Farabow, Garrett & Dunner, LLP

(57) ABSTRACT

When an actual output value is less than an output command value, a current command value is increased. When the actual output value is equal to or greater than the output command value, whether the actual output value is within a range of a dead band is determined. When the actual output value is outside the range of the dead band, the current command value is decreased. When the actual output value is within the range of the dead band, the current command value is maintained.

1 Claim, 5 Drawing Sheets

FUEL CELL SYSTEM

INCORPORATION BY REFERENCE

The disclosure of Japanese Patent Application No. 2015-127688 filed on Jun. 25, 2015 including the specification, drawings and abstract is incorporated herein by reference in its entirety.

BACKGROUND OF THE INVENTION

1. Field of the Invention

The invention relates to a fuel cell.

2. Description of Related Art

There is a known technique in which a fuel cell is operated at a low-efficiency operating point when a warm-up operation of the fuel cell is required (refer to Japanese Patent Application Publication No. 2007-184243 (JP 2007-184243 A)). According to the technique described in JP 2007-184243 A, in order to operate the fuel cell at a low-efficiency operating point, the generated voltage is decreased with the use of a converter, and the feed rate of cathode gas fed by an air compressor is reduced. With this control, the operating point is changed with the output kept constant, so that the fuel cell shifts to a warm-up operation.

With regard to the above-described fuel cell, sufficient consideration is not given to stable continuation of the warm-up operation. For example, when the output is changed during continuation of the warm-up operation, the converter and the air compressor are controlled to change the operating point of the fuel cell. For example, in the case where the converter is configured to be controlled such that the generated current approaches a target value, the target value of the generated current is increased when the output is increased, and the target value of the generated current is decreased when the output is decreased. In parallel with the control of the converter, the feed rate of the cathode gas fed by the air compressor is regulated such that a targeted output is achieved. It is known that, in a fuel cell, the generated current and the generated voltage exhibit a specific correlation when the amounts of hydrogen and oxygen to be fed are constant. Hereinafter, the correlation will be referred to as "I-V characteristic".

The control of the feed rate of the cathode gas fed by the air compressor is lower in responsiveness than the control by the converter. Thus, in some cases, the operating point is changed in a situation where the control of the generated current by the converter is dominant control.

It should be noted that, depending on the operating point of the fuel cell, a decrease in the generated current may cause a rise in the output rather (the detail will be described with reference to FIG. 4). Therefore, when the output is decreased only by a decrease in the generated current in order to decrease the output from such an operating point, the operating point is changed to an operating point at which the generated current is lower than the generated current at an operating point at which the output reaches the peak. Generally, the I-V characteristic exhibits the following tendency: in a region in which the generated current is low, the lower the generated current is, the higher the generated voltage is. Therefore, when the operating point is changed in the above-described manner, the generated voltage becomes higher. On the other hand, as described later in detail, when the generated voltage is high, the amount of heat generation is small. Therefore, when the operating point is changed in the above-described manner, the amount of heat generation becomes small and thus the warm-up operation is interrupted.

SUMMARY OF THE INVENTION

The invention provides a technique for stably continuing a warm-up operation without interruption.

An aspect of the invention relates to a fuel cell system comprising: a fuel cell that receives anode gas and cathode gas to generate electric power; a load that consumes the electric power generated by the fuel cell; a secondary battery that stores the electric power generated by the fuel cell; a compressor that feeds the cathode gas to the fuel cell; a converter that controls a generated current of the fuel cell; and a controller configured to i) calculate an output command value based on information acquired from the load and the secondary battery, the output command value being a value indicating a required output that is required of the fuel cell, ii) control the compressor such that an output of the fuel cell approaches the calculated output command value, iii) determine a current command value, the current command value being a target value of the generated current of the fuel cell, and iv) control the converter in accordance with the determined current command value. The controller configured to, during a low-efficiency electric power generation operation in which electric power generation efficiency of the fuel cell is decreased by reducing a feed rate of the cathode gas with respect to a feed rate of the anode gas, v) determine, as the current command value, a current value calculated such that the output of the fuel cell approaches the calculated output command value, in a first state where one of a condition that the output of the fuel cell is greater than the calculated output command value by an amount equal to or greater than a predetermined value and a condition that the output of the fuel cell is less than the output command value is satisfied, and vi) determine, as the current command value, a current value calculated in the immediately preceding first state, in a second state where the output of the fuel cell is greater than the calculated output command value by an amount less than the predetermined value.

According to the above-described aspect, during the low-efficiency electric power generation operation, when the output of the fuel cell is greater than the output command value by an amount less than the predetermined value, the current command value is maintained. Therefore, it is possible to avoid the situation where the fuel cell shifts to a high-efficiency operation in which the amount of heat generation is low in order to eliminate the state where the output of the fuel cell is greater than the output command value by an amount less than the predetermined value.

The invention may be implemented in various other modes than the above-described mode. For example, the invention may be implemented in modes, such as a warm-up method for a fuel cell, a computer program for carrying out the method, and a non-temporary storage medium in which the computer program is stored.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
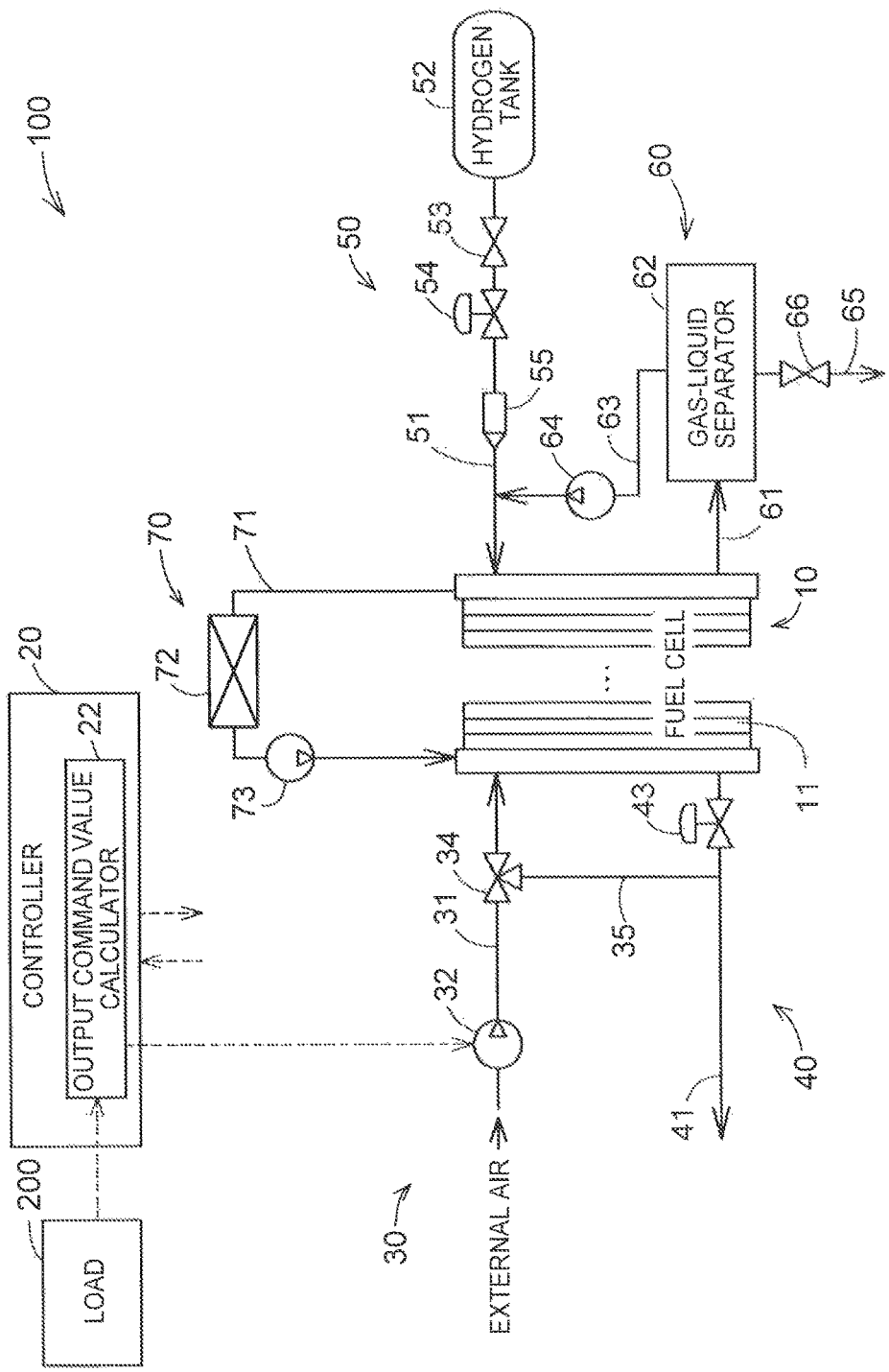
FIG. 1 is a diagram schematically illustrating the configuration of a fuel cell system.

FIG. 1 is a diagram schematically illustrating the configuration of a fuel cell system 100. The fuel cell system 100 includes a fuel cell 10, a controller 20, a cathode gas feeder 30, a cathode gas discharger 40, an anode gas feeder 50, an anode gas circulator-discharger 60, and a coolant feeder 70.

The fuel cell 10 is a polymer electrolyte fuel cell that receives hydrogen (anode gas) and air (cathode gas), which are fed thereto as reactant gases, to generate electric power. The fuel cell 10 has a stack structure including a plurality of (e.g. 400) cells 11 that are stacked together. Each cell 11 includes a membrane-electrode assembly and two separators. The membrane-electrode assembly is an electric power generating body including an electrolyte membrane and electrodes disposed on respective surfaces of the electrolyte membrane. The membrane-electrode assembly is held between the two separators.

The electrolyte membrane is composed of a solid polymer thin membrane that exhibits favorable proton conductivity in a wet state. The electrode is made of carbon. Platinum catalysts for promoting reaction for electric power generation are supported on the electrolyte-membrane-side surfaces of the electrodes. Each cell 11 is provided with manifolds (not illustrated) for reactant gases and a coolant. The reactant gases in the manifolds are fed to an electric power generation region of each cell 11 through gas passages provided in the cell 11.

The controller 20 controls components of the furl cell system 100, which will be described below, thereby causing the fuel cell 10 to generate electric power.

The cathode gas feeder 30 includes a cathode gas pipe 31, an air compressor 32, and a flow diverter valve 34. The cathode gas pipe 31 is a pipe connected to the cathode side of the fuel cell 10. The air compressor 32 is connected to the fuel cell 10 through the cathode gas pipe 31. The air compressor 32 takes in external air and compresses it, and then feeds the compressed air, as cathode gas, to the fuel cell 10. The rotational speed of the air compressor 32 is controlled such that an output value obtained by electric power generation (hereinafter, referred to as "actual output value") approaches an output command value, whereby the flow rate of the cathode gas is controlled. The output command value is used as a target value of the output from the fuel cell 10. The output command value is determined by an output command value calculator 22 included in the controller 20, based on, for example, a request from a load 200.

The flow diverter valve 34 is disposed between the air compressor 32 and the fuel cell 10. Further, the flow diverter valve 34 is connected to a bypass 35. The bypass 35 is a flow passage that connects the flow diverter valve 34 to a cathode exhaust gas pipe 41 (described later). When the compressed air from the air compressor 32 is fed to the fuel cell 10, the flow diverter valve 34 interrupts an air flow toward the bypass 35, and provides communication between the upstream side and downstream side of the cathode gas pipe 31. On the other hand, when the compressed air from the air compressor 32 is not fed to the fuel cell 10, the flow diverter valve 34 interrupts an air flow toward the downstream side of the cathode gas pipe 31, and provides communication between the upstream side of the cathode gas pipe 31 and the bypass 35.

The cathode gas discharger 40 includes the cathode exhaust gas pipe 41 and a pressure regulating valve 43. The cathode exhaust gas pipe 41 is a pipe connected to the cathode side of the fuel cell 10. The cathode exhaust gas is discharged to the outside of the fuel cell system 100 through the cathode exhaust gas pipe 41. The pressure regulating valve 43 regulates the pressure of the cathode exhaust gas flowing through the cathode exhaust gas pipe 41 (back pressure of the fuel cell 10).

The anode gas feeder 50 includes an anode gas pipe 51, a hydrogen tank 52, an on-off valve 53, a regulator 54, and an injector 55. The hydrogen tank 52 is connected to the anode side of the fuel cell 10 through the anode as pipe 51. The hydrogen is fed from the tank to the fuel cell 10.

The on-off valve 53, the regulator 54, and the injector 55 are disposed on the anode gas pipe 51 in this order from the upstream side (i.e., the side close to the hydrogen tank 52). The on-off valve 53 is opened and closed at a command from the controller 20, thereby adjusting the inflow of hydrogen from the hydrogen tank 52 to the upstream side of the injector 55. The regulator 54 is a pressure-reducing valve that regulates the pressure of hydrogen on the upstream side of the injector 55.

The injector 55 is an electromagnetically-driven on-off valve including a valve element that is electromagnetically driven based on the drive cycle and valve open period set by the controller 20. The controller 20 controls the amount of hydrogen to be fed to the fuel cell 10, by controlling the drive cycle and valve open period of the injector 55.

The anode gas circulator-discharger 60 includes an anode exhaust gas pipe 61, a gas-liquid separator 62, an anode gas circulation pipe 63, a hydrogen circulation pump 64, an anode drain pipe 65, and a drain valve 66. The anode exhaust gas pipe 61 is a pipe that connects an anode outlet of the fuel cell 10 to the gas-liquid separator 62. The anode exhaust gas pipe 61 guides, to the gas-liquid separator 62, the anode exhaust gas containing unreacted gas (e.g. hydrogen and nitrogen) that has not been used for reaction for electric power generation.

The gas-liquid separator 62 is connected to the anode gas circulation pipe 63 and the anode drain pipe 65. The gas-liquid separator 62 separates the gas component and water contained in the anode exhaust gas from each other. The gas-liquid separator 62 guides the gas component to the anode gas circulation pipe 63, and guides the water to the anode drain pipe 65.

The anode as circulation pipe 63 is connected to the anode gas pipe 51 at a position downstream of the injector 55. The hydrogen circulation pump 64 is disposed on the anode gas circulation pipe 63. The hydrogen contained in the gas component that is separated from the water in the gas-liquid separator 62 is sent to the anode gas pipe 51 by the hydrogen circulation pump 64. In this way, in the fuel cell system 100, the hydrogen contained in the anode exhaust gas is circulated to be fed again to the fuel cell 10. As a result, the hydrogen use efficiency is improved.

The anode drain pipe 65 is a pipe through which the water that is separated from the gas component in the gas-liquid separator 62 is discharged to the outside of the fuel cell system 100. The drain valve 66 is disposed on the anode drain pipe 65. The drain valve 66 is opened and closed at a command from the controller 20. The controller 20 usually keeps the drain valve 66 closed during the operation of the fuel cell system 100, and opens the drain valve 66 at predetermined drain timing set in advance or at timing for discharging inert gas contained in the anode exhaust gas.

The coolant feeder 70 includes a coolant pipe 71, a radiator 72, and a coolant circulation pump 73. The coolant pipe 71 is a pipe that connects a coolant inlet manifold and a coolant outlet manifold that are provided in the fuel cell 10. The coolant for cooling the fuel cell 10 is circulated through the coolant pipe 71. The radiator 72 is disposed on the coolant pipe 71. The radiator 72 performs heat exchange between the coolant flowing through the coolant pipe 71 and the external air, thereby cooling the coolant.

The coolant circulation pump 73 is disposed on the coolant pipe 71, at a position downstream of the radiator 72 (at a position between the radiator 72 and the coolant inlet of the fuel cell 10). The coolant circulation pump 73 sends the coolant cooled in the radiator 72 to the fuel cell 10.

Figure 2:
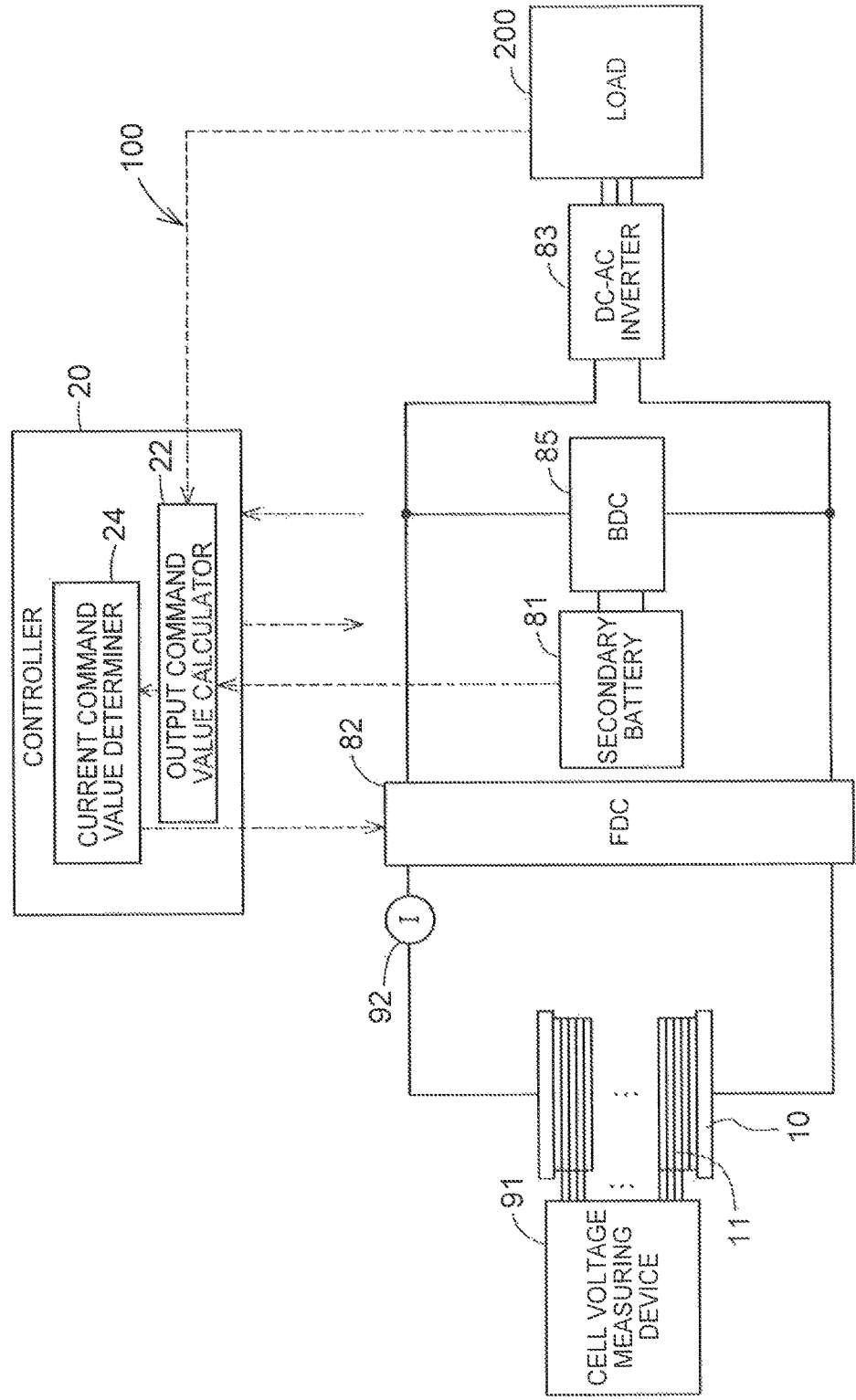
FIG. 2 is a diagram schematically illustrating the electrical configuration of the fuel cell system.

FIG. 2 is a diagram schematically illustrating the electrical configuration of the fuel cell system 100. The fuel cell system 100 includes a secondary battery 81, an FDC 82, a DC-AC inverter 83, a BDC 85, a cell voltage measuring device 91, and a current measuring device 92, in addition to the above-described components such as the controller 20.

The cell voltage measuring device 91 is connected to each cell 11 of the fuel cell 10 to measure the voltage (cell voltage) of each cell 11. The cell voltage measuring device 91 transmits the measurement results to the controller 20. The current measuring device 92 measures the value of current generated by the fuel cell 10, and transmits the value of generated current to the controller 20.

The FDC 82 and the BDC 85 are circuits that are configured as DC/DC converters. The FDC 82 controls the current generated by the fuel cell 10, based on a current command value that is transmitted from a current command value determiner 24 included in the controller 20. The current command value is used as a target value of the current generated by the fuel cell 10. The current command value is determined by the controller 20. Further, the FDC 82 transforms the generated voltage and feeds the generated voltage to the DC-AC inverter 83, and measures the value of the generated voltage and transmits the value to the controller 20. The BDC 85 controls charging and discharging of the secondary battery 81, under the control of the controller 20. The secondary battery 81 is configured as a lithium-ion battery, and functions as an auxiliary power supply for the fuel cell 10.

The DC-AC inverter 83 is connected to the fuel cell 10 and the load 200. The DC-AC inverter 83 converts the direct-current electric power obtained from the fuel cell 10 and the secondary battery 81, into alternating-current electric power, and feeds the alternating-current electric power to the load 200. The regenerative electric power generated in the load 200 is converted into direct-current electric power by the DC-AC inverter 83, and the BDC 85 charges the direct-current electric power to the secondary battery 81. When calculating the output command value, the output command value calculator 22 takes into account the state of charge (SOC) of the secondary battery 81 in addition to the load 200.

Next, a quick warm-up will be described. The quick warm-up is an operation mode of raising the temperature of the fuel cell 10 by operating the fuel cell 10 under a low-efficiency electric power generation condition (described later). The quick warm-up is achieved by decreasing the feed rate of the cathode gas with respect to the feed rate of the anode gas. The quick warm-up will be described with reference to FIG. 3 and FIG. 4.

Figure 3:
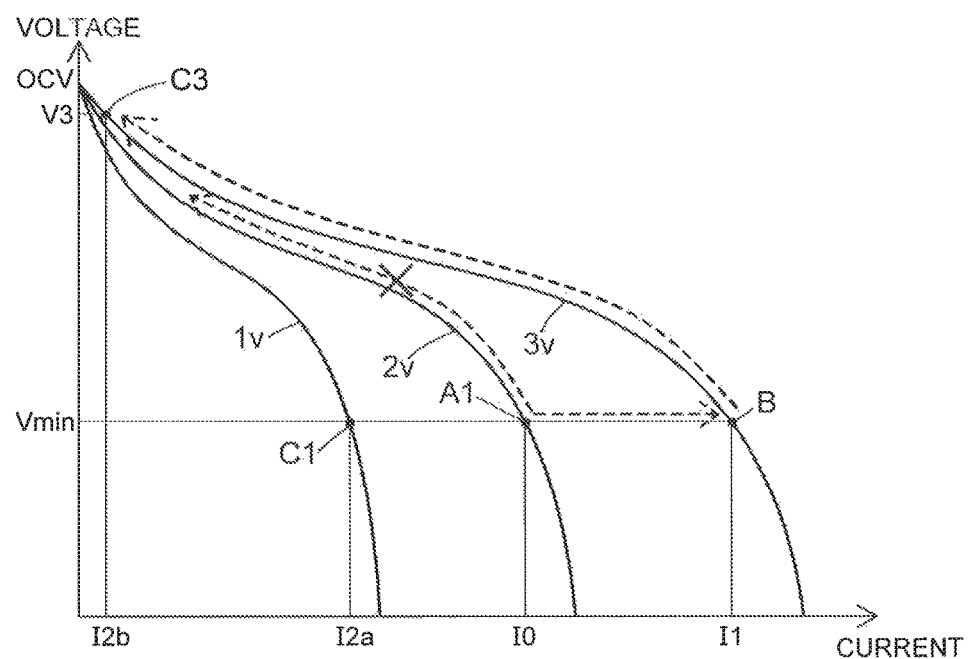
FIG. 3 is a graph illustrating the I-V characteristic of a fuel cell.

FIG. 3 is a graph illustrating the I-V characteristic of the fuel cell 10. A curve 1$v$ illustrates the case where the flow rate of the cathode gas is a flow rate F1 (hereinafter, "flow rate" means the flow rate of the cathode gas), a curve 2$v$ illustrates the case where the flow rate is a flow rate F2 (F2>F1), and a curve 3$v$ illustrates the case where the flow rate is a flow rate F3 (F3>F2). The flow rate of the anode gas is sufficiently high, and the anode gas in amount sufficient for electric power generation is secured.

Figure 4:
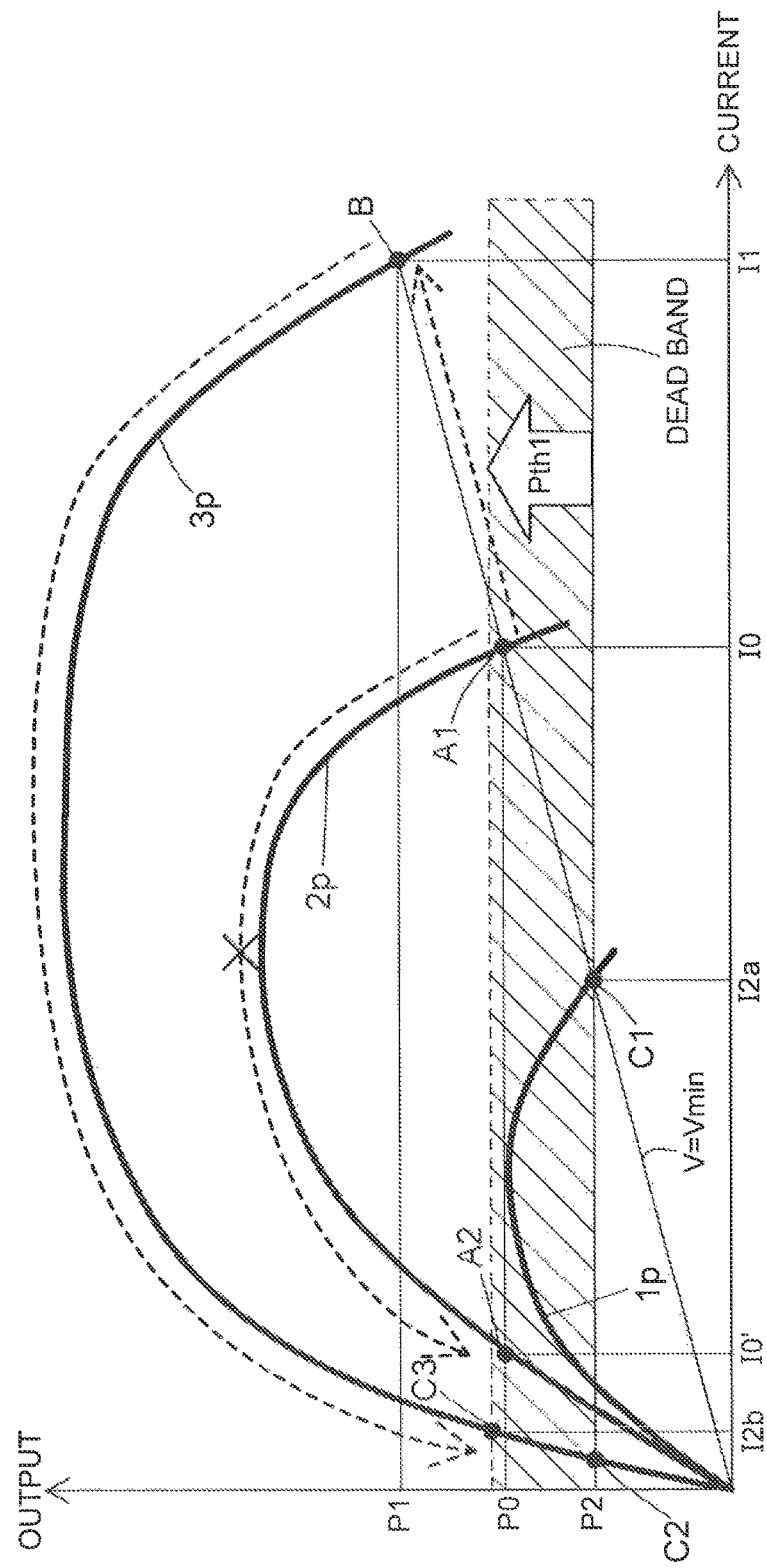
FIG. 4 is a graph illustrating the output-current characteristic of the fuel cell.

FIG. 4 is a graph illustrating the output-current characteristic of the fuel cell of the fuel cell 10. A curve 1$p$ illustrates the case where the flow rate is the flow rate F1, a curve 2$p$ illustrates the case where the flow rate is the flow rate F2, and a curve 3$p$ illustrates the case where the flow rate is the flow rate F3.

As illustrated in FIG. 4, in the case where the output command value indicates an output P0 and the flow rate is the flow rate F2, theoretically, the actual output value becomes equal to the output command value when the operating point is adjusted to one of a current I0 (operating point A1) and a current I0' (operating point A2).

The amount of the heat generation of the fuel cell 10 decreases as the generated voltage approaches a heat generation reference voltage. This is because theoretical value of the amount of the heat generation is calculated by the following Expression (1).

$$\text{Amount of Heat Generation} = (\text{Heat Generation Reference Voltage} - \text{Generated Voltage}) \times \text{Generated Current} \quad (1)$$

Here, the heat generation reference voltage is the energy, expressed in voltage, which is calculated from an enthalpy change in the reaction between hydrogen and oxygen, and the heat generation reference voltage is expressed by a value obtained by dividing the enthalpy by the Faraday constant and the number of electrons of hydrogen. Usually, the heat generation reference voltage exhibits a value that is higher than an open-circuit voltage OCV.

On the other hand, in the quick warm-up, the amount of heat generation is increased and the temperature of the fuel cell 10 is raised, by adjusting the operating point to the current I0. The current IC is on the higher current side with respect to the current value corresponding to the peak of the curve 2$p$. Further, at the current I0, the generated voltage is lower than the generated voltage corresponding to the peak of the curve 2$p$.

As illustrated in FIG. 3 and FIG. 4, at the operating point A1, the generated voltage is a lower limit voltage Vmin. The FDC 82 is configured to control the generated current such that the generated voltage does not fall below the lower limit voltage Vmin. The reason the generated voltage at the operating point A1 for performing the quick warm-up is the lower limit voltage Vmin is that the generated voltage is reduced as much as possible in order to increase the amount of heat generation. The flow rate F2 is a flow rate achieved by the control for achieving the output P0 under the condition of the lower limit voltage Vmin. Due to such control, while the actual output value approaches the output command value, the amount of heat generation required for the quick warm-up is secured.

Figure 5:
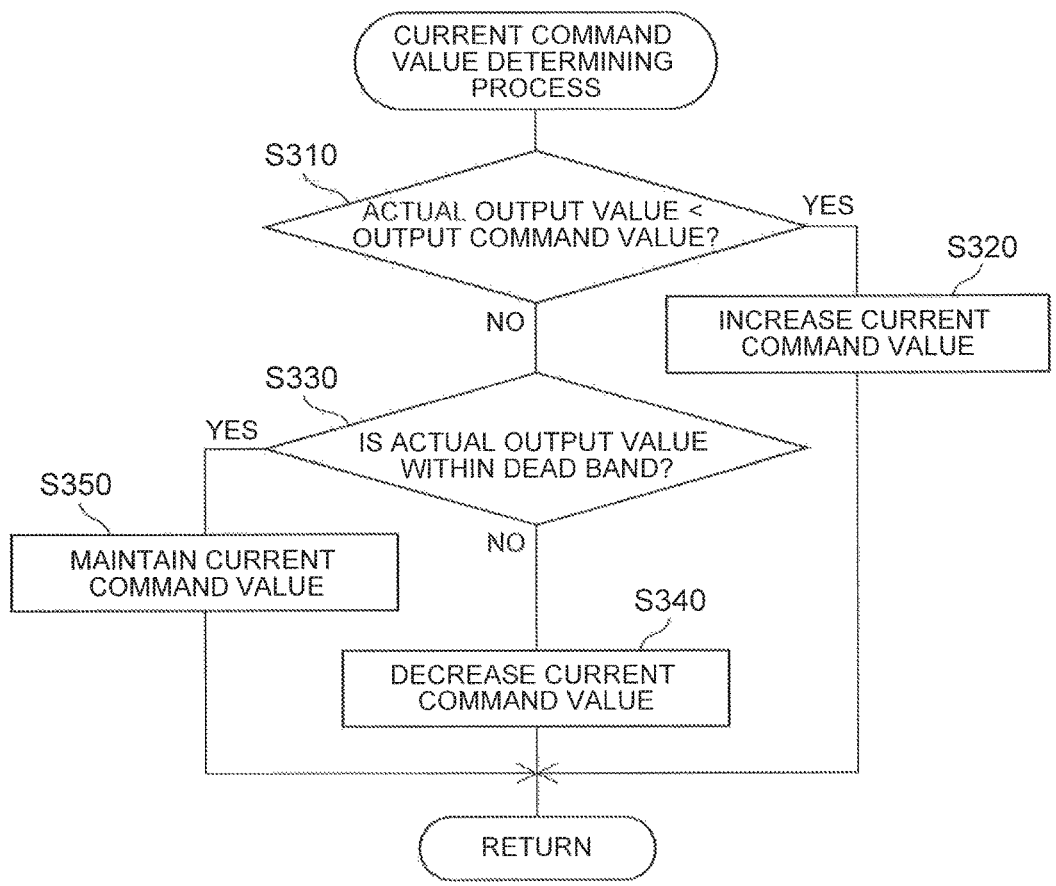
FIG. 5 is a flowchart illustrating a current command value determining process.

The above-described control will be described below in more detail. FIG. 5 is a flowchart illustrating a current command value determining process. The current command value determiner 24 of the controller 20 executes the current command value determining process repeatedly during the quick warm-up of the fuel cell 10.

First, the current command value determiner 24 determines whether the actual output value is less than the output command value (S310). When the actual output value is less than the output command value (YES in S310), the current command value is increased such that the actual output value approaches the output command value (S320), and the current command value determining process is ended. The case where the current command value is increased will be described with reference to FIG. 3 and FIG. 4.

The case where the actual output value is the output P0 at the operating point A1 and the output command value is an output P1 (output P1>output P0) as illustrated in FIG. 4 will be described as an example. At the operating point A1, the generated voltage is the lower limit voltage Vmin. Therefore, the FDC 82 cannot increase the generated current, when the flow rate is maintained even in the case where the current command value is increased. However, when the air compressor 32 increases the flow rate, the generated current corresponding to the lower limit voltage Vmin gradually increases. When the operating point reaches an operating point B in this way, the output P1 is achieved.

On the other hand, when the actual output value is equal to or greater than the output command value (NO in S310), the current command value determiner 24 determines whether the actual output value is within a range of a dead band (S330). The dead band will be described with reference to FIG. 4. If the output command value is an output P2, the lower limit of the dead band is the output P2, and the upper limit of the dead band is an output (P2+Pth1). An output Pth1 is a positive output value. That is, the dead band is set only on the positive side with respect to the output command value. Note that, although the output Pth1 is a value considerably smaller than the output P2, the output Pth1 is indicated in FIG. 4 as a value greater than its actual value for the sake of visualization.

When the actual output value is outside the range of the dead band NO in S330), the current command value is decreased such that the actual output value approaches the output command value (S340), and then the current command value determining process is ended. The case where the actual output value is outside the range of the dead band can be regarded as the case where the actual output value is greater than the output command value by an amount equal to or greater than the predetermined value Pth1. The case where the current command value is decreased will be described with reference to FIG. 3 and FIG. 4.

The case where the actual output value is the output P1 (operating point B) and is thus outside the dead band and the output command value is the output P2 (output P2<output P1) as illustrated in FIG. 4 will be described as an example. In this case, in order to achieve the output P2 while maintaining the lower limit voltage Vmin for the quick warm-up, the operating point is adjusted to an operating point C1 by adjusting the flow rate of the cathode gas to the flow rate F1 (on the curve 1p) and setting the current command value to a current I2a, as illustrated in FIG. 4.

However, the flow rate control is lower in responsiveness than the current control. Thus, the FDC 82 decreases the generated current, before the operating point is shifted from the operating point B to the operating point C1 due to a decrease in the flow rate. As a result, while the flow rate hardly changes from the flow rate F3, the actual operating point approaches an operating point C2 corresponding to the flow rate F3 and the output P2. However, because the dead band is set, a decrease in the generated current stops when the operating point reaches an operating point C3 (current I2b) at which the output (P2+Pth1) is achieved, as illustrated in FIG. 4.

The generated voltage at the operating point C3 is a voltage V3 (FIG. 3), and is a value close to the open-circuit voltage OCV. Thus, the amount of heat generation is small. However, when the actual output value is outside the dead band, the difference between the actual output value and the output command value is large. Therefore, a higher priority is given to the control of the output value than the quick warm-up, and the output value is controlled as described above.

On the other hand, when the actual output value is within the range of the dead band (YES in S330), the current command value is maintained without being decreased (S350), and then the current command value determining process is ended. When the actual output value is within the range of the dead band (YES in S330), even if the actual output value does not coincide with the output command value, the current command value calculated in the immediately preceding S320 or S330 is maintained, without calculating the current command value liar causing the actual output value to approach the output command value. In the present embodiment, because the dead band is set only on the positive side with respect to the output command value, the actual output value is greater than the output command value.

The case where the actual output value is within the range of the dead band can be regarded as the case where the actual output value is greater than the output command value by an amount less than the predetermined value Pth1. The case where the actual output value is within the range of the dead band will be described with reference to FIG. 3 and FIG. 4.

The case where the actual output value is the output P0 (operating, point as A1), the output command value is the output P2, and (P2+Pth1)>P0>P2 as illustrated in FIG. 4 will be described as an example. In this case, because the current command value is maintained, a sudden rise in the actual output value or the generated voltage is avoided. Note that, even when a decrease in the current command value is avoided as described above, the flow rate achieved by the air compressor 32 may vary under the condition that there is a difference between the actual output value and the output command value, and therefore, the operating point may also vary.

As described above, when the current command value is maintained even though the actual output value is greater than the output command value, surplus electric power is generated. The surplus electric power is stored in the secondary battery 81. Thus, even when the dead band is set as described above, the operation of the fuel cell system 100 is not adversely affected.

When the actual output value is equal to the output command value, an affirmative determination is made in S330. Thus, in this case, it is possible to maintain the state where the actual output value is equal to the output command value, by maintaining the current command value.

According to the above-described embodiment, even when the actual output value is greater than the output command value, the current command value is maintained as long as the difference between the actual output value and the output command value is equal to or less than the output Pth1. Thus, it is possible to avoid a situation where the generated voltage is significantly raised to slightly decrease the output value and thus the quick warm-up is interrupted. Further, a dead band is not set on the negative side with respect to the output command value. Therefore, in the case where the output is raised, the responsiveness is not lowered.

The invention is not limited to the embodiment in the specification, and may be implemented in various other embodiments within the scope of the invention.

The flow rate may be controlled based on a value other than the output value. For example, the control may be executed such that the flow rate is increased when the current command value is increased and the flow rate is decreased when the current command value is decreased. In this case, when the current command value is maintained, the flow rate is also maintained, and therefore, the operating point is also maintained.

The determination of the output command value, the determination of the current command value to be provided to the FDC, and the control of the flow rate to be achieved by the air compressor may be collectively executed by the controller 20 as in the above-described embodiment, or may executed by a plurality of control units (e.g. ECUs) in a coordinated manner. When the determinations and the control are executed by a plurality of control units (e.g. ECUs) in a coordinated manner, the plurality of control units may be regarded collectively as the controller. The dead band when the current output is higher than the required output may be greater in width than the dead band when the current output is lower than the required output.

The fuel cell may be a fuel cell other than a fuel cell for an automobile. The fuel cell may be a fuel cell mounted in another kind of vehicle (e.g. a two-wheel vehicle, or a train), or a stationary fuel cell.

What is claimed is:
1. A fuel cell system comprising:
a fuel cell that receives anode gas and cathode gas to generate electric power;
a load that consumes the electric power generated by the fuel cell;
a secondary battery that stores the electric power generated by the fuel cell;
a compressor that feeds the cathode gas to the fuel cell;
a converter that controls a generated current of the fuel cell; and
a controller programmed to
calculate an output command value based on information acquired from the load and the secondary battery, the output command value being a value indicating a required output that is required of the fuel cell,
control the compressor such that an output of the fuel cell approaches the calculated output command value,
determine a current command value, the current command value being a target value of the generated current of the fuel cell, and
control the converter in accordance with the determined current command value,
the controller being further programmed to,
during a low-efficiency electric power generation operation in which electric power generation efficiency of the fuel cell is decreased by reducing a feed rate of the cathode gas with respect to a feed rate of the anode gas,
determine, as the current command value, a current value calculated such that the output of the fuel cell approaches the calculated output command value, in a first state where one of a condition that the output of the fuel cell is greater than the calculated output command value by an amount equal to or greater than a predetermined value and a condition that the output of the fuel cell is less than the output command value is satisfied, and
determine, as the current command value, a current value calculated in the immediately preceding first state, in a second state where the output of the fuel cell is greater than the calculated output command value by an amount less than the predetermined value.

* * * * *